US012808240B2

(12) United States Patent
Napthine

(10) Patent No.: US 12,808,240 B2
(45) Date of Patent: Nov. 24, 2026

(54) INTEGRATED LOCKING PIN

(71) Applicant: Gatemaster Ltd, Bognor Regis (GB)

(72) Inventor: Simon Garth Napthine, Eastergate (GB)

(73) Assignee: Gatemaster Ltd, Bognor Regis (GB)

( * ) Notice: Subject to any disclaimer, the term of this patent is extended or adjusted under 35 U.S.C. 154(b) by 59 days.

(21) Appl. No.: 18/433,766

(22) Filed: Feb. 6, 2024

(65) Prior Publication Data

US 2024/0263497 A1 Aug. 8, 2024

(30) Foreign Application Priority Data

Feb. 7, 2023 (EP) .................................... 23155274

(51) Int. Cl.
*E05C 7/04* (2006.01)
*E05C 3/00* (2006.01)
*E05C 3/04* (2006.01)

(52) U.S. Cl.
CPC ................ *E05C 7/04* (2013.01); *E05C 3/004* (2013.01); *E05C 3/044* (2013.01)

(58) Field of Classification Search
CPC .... Y10S 292/29; Y10S 292/37; Y10S 292/63; E05B 65/0007; E05C 1/08; E05C 3/004; E05C 3/044; Y10T 292/096; Y10T 292/0969; Y10T 292/0977
USPC .............................................. 49/55, 57, 465
See application file for complete search history.

(56) References Cited

U.S. PATENT DOCUMENTS 5,020,840 A 6/1991 Winter
10,859,079 B2 * 12/2020 Zhang .................. F04B 39/121
2014/0019518 A1 1/2014 Nepper et al.
2014/0191518 A1 * 7/2014 Hellander ........... E05B 65/0007 292/281
2022/0325538 A1 * 10/2022 Smith ....................... E04G 1/30

FOREIGN PATENT DOCUMENTS

DE 202020000327 U1 * 2/2020 ............. E05C 3/044
FR 2519060 A1 7/1983
GB 2164991 A 4/1986

OTHER PUBLICATIONS

Translation of DE202020000327 (Year: 2020).*
Extended European Search Report for EP Application No. 23155274.6 dated Jul. 21, 2023.

* cited by examiner

*Primary Examiner* — Christine M Mills
*Assistant Examiner* — Yahya Sidky
(74) *Attorney, Agent, or Firm* — Foley Hoag LLP; Benjamin A. Vaughan; Janine S. Ladislaw

(57) ABSTRACT

A gate fastener is provided for securing a double gate, comprising a pivotable body that is fixable to a first gate, wherein the pivotable body comprises at least one recess for receiving a gate rail on the second gate; wherein the pivotable body comprises at least one aperture on a side thereof that is capable of retaining a locking pin; and wherein in a first position, the locking pin spans the recess and prevents movement of the gate rail out of the recess, and wherein in a second position, the locking pin is retracted from the recess such that a portion thereof is retained within the pivotable body without preventing movement of the gate rail out of the recess. Also provided is a gate having said fastener and a method of securing a double gate using the fastener.

15 Claims, 4 Drawing Sheets

INTEGRATED LOCKING PIN

CROSS-REFERENCE TO RELATED APPLICATIONS

Figure 1:
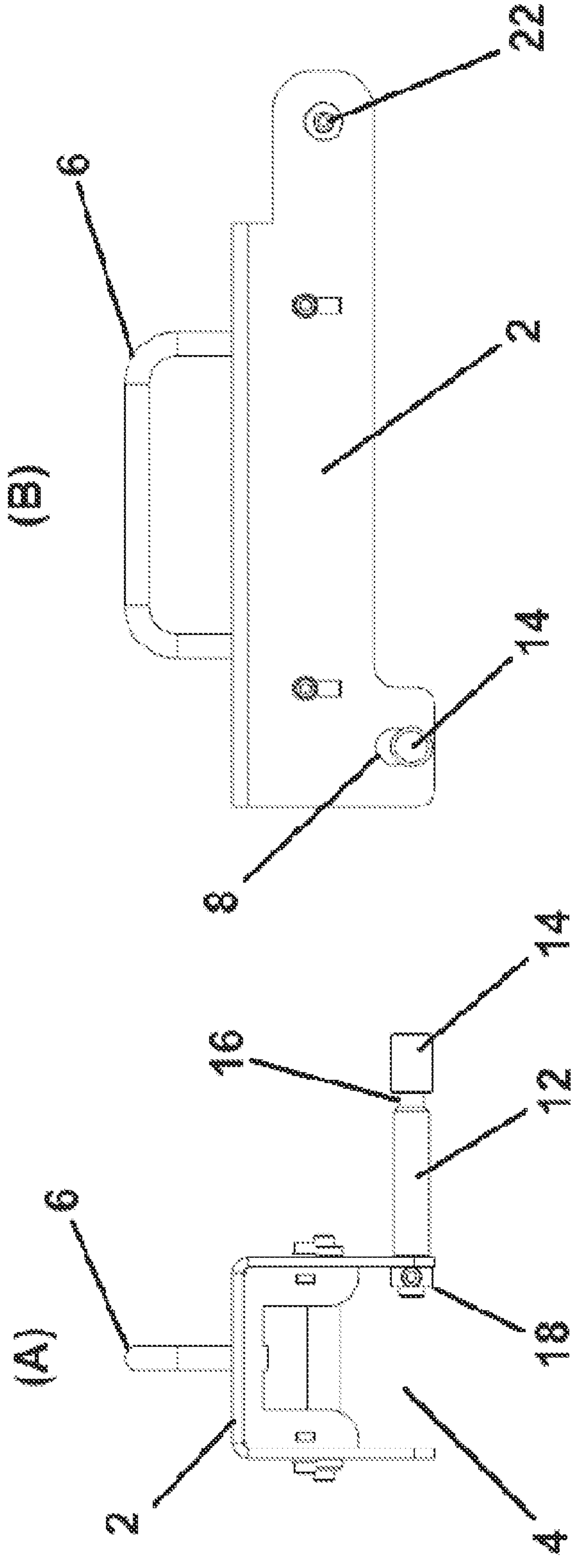
Figure 2:
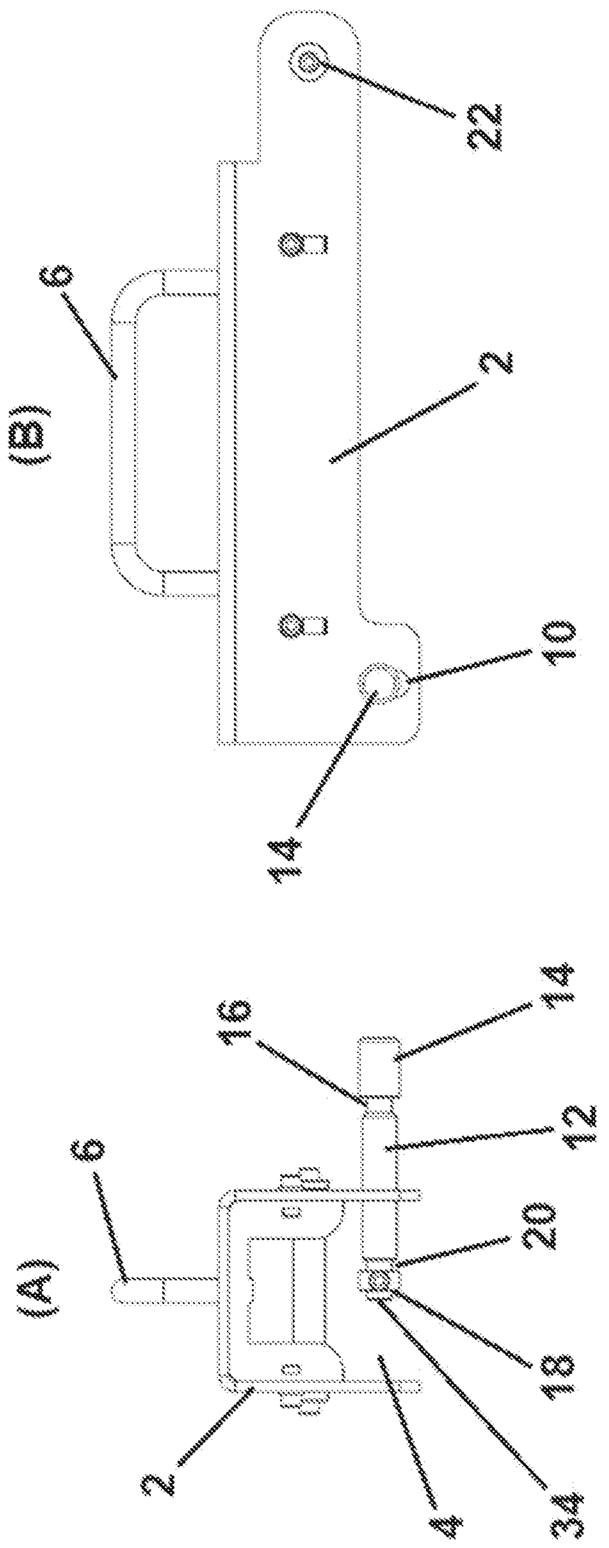
Figure 3:
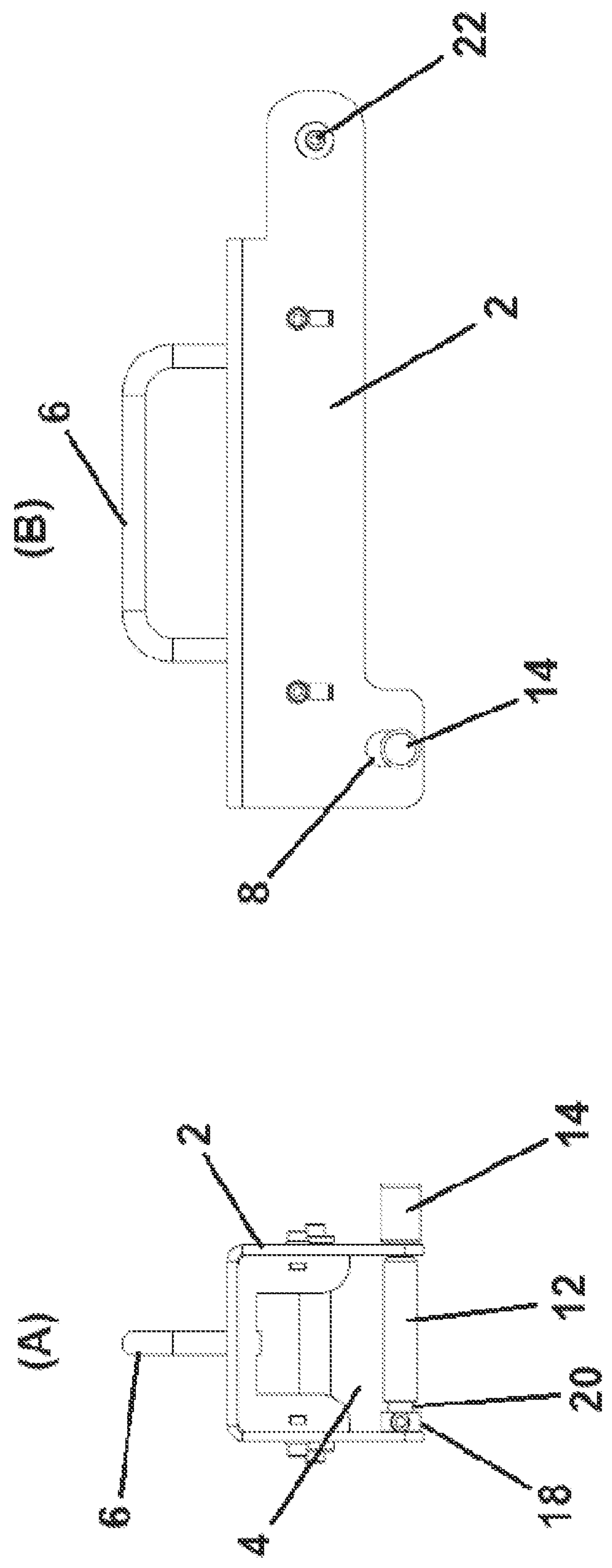

This application claims the benefit of priority to EP Application No. 23155274.6, filed Feb. 7, 2023, the entire contents of which is incorporated herein by reference.

INTRODUCTION

The present invention relates to locking gate fasteners, specifically for use with double gates, and to gates having such latches affixed.

BACKGROUND TO THE INVENTION

Many types of gate-fastening devices are known. Less common are fastening means for use in conjunction with a swing gate that lies adjacent to another swing gate (AKA a double gate).

Examples of locking mechanisms known in the art include those described in DE 202020000327, FR 2519060, and US 2014/191518.

DE 202020000327 describes a hasp bolt for locking 2-leaf gates. FR 2519060 describes a locking device for a service gate on toll motorways. US 2014/191518 describes a brace for the top rail of a fence gate.

One known fastener that works to secure one swing gate of a double gate to the other swing gate works by being pivotally mounted to the top of one of the gates (see e.g., US 2014/191518). When in the open position, the gates can swing freely (often in only one direction, due to the presence of a hinge stop). In order to close the gates and prevent the swinging thereof, the fastener is pivoted 180 degrees from a first position in which it lies across and is supported by the gate to which it is affixed to a second position in which it mounts the other gate as well. These types of gate fasteners are typically referred to as "throw over gate loops".

Typically, this type of double gate fastener is used without locking means, i.e., without a mechanism designed to prevent the movement of the fastener when the gates are in the closed position and the fastener lies across the adjacent gates, so as to fasten them together. This is because, in many settings, a locking means is not necessary. However, in certain settings, it is advantageous to lock the fastener in position, e.g., when adverse weather conditions make it possible that the fastener opens without user intervention. This is particularly problematic in off-shore settings, such as windfarms and oilrigs.

When locking is required, typically a pin is provided on a wire cable. This pin hangs down from the gate when not in use, but it can be inserted through the fastener when locking is required. A significant disadvantage of this approach lies in that these configurations can result in user injury and/or loss of the pin. The components, in particular the wire, are prone to deterioration over time (especially in off-shore settings). The pin is often very heavy and if it is inadvertently released from the wire, it can cause damage to property and/or personnel, as well as becoming lost.

It is thus clear from the technical field that there exists a need for an alternative and, preferably, improved locking means for a double gate fastener that provides the end user with convenience, safety and security for minimal cost.

An aim of the present invention is therefore to provide a new and improved fastener for a double gate.

SUMMARY OF THE INVENTION

The invention provides a gate fastener for securing a double gate, comprising:

a pivotable body that is fixable (e.g., using a screw) to a first gate, wherein the pivotable body comprises at least one recess for receiving a gate rail on the second gate;

wherein the pivotable body comprises at least one aperture on a side thereof that is capable of retaining a locking pin; and characterised in that (a) in a first position, the locking pin spans the recess and prevents movement of the gate rail out of the recess, and (b) in a second position, the locking pin is retracted from the recess such that a portion thereof is retained within the pivotable body without preventing movement of the gate rail out of the recess.

The aperture(s) in the pivotable body that the locking pin is designed to accommodate may otherwise be called slots or retaining slots.

The interplay between the locking pin and the aperture surround is what makes the locking pin "integrated". The locking pin cannot simply be removed from the pivotable body by protrusion through/retraction from the aperture.

The pivotable body may comprise at least two apertures that are aligned on either side of its recess and are capable of retaining the locking pin.

Preferably, at least one of the apertures in the pivotable body has a wide portion and a narrow portion, with only the wide portion permitting movement of the locking pin between the first and second positions. This is advantageous, since when the locking pin rests in the narrow portion, the locking pin is secured and the gate cannot be opened/unlocked without user intervention.

The narrow portion of the aperture may be provided below the wide portion, such that the locking pin can fall into the first position in which it cannot be retracted or protruded without user intervention. This is beneficial because it means that when the locking pin is protruded through the recess, it naturally falls down into a position in which it is secured and thus reduces the risk that the pin should become accidentally retracted (i.e., without user interaction).

In order to provide this advantageous security, the locking pin may comprise a neck that is of smaller diameter than its main body. The neck is of a diameter that is smaller than the diameter of the narrow portion of the aperture in the pivotable body, such that it slots into the narrow portion. The main body is of a diameter that is larger than the diameter of the narrow portion but of a diameter that is smaller than the diameter of the wide portion of the aperture in the pivotable body, such that the locking pin is secured in the narrow portion/slot. This is essentially because the main body of the locking pin abuts the internal (recess-facing) surface of the pivotable body at the location of the aperture, preventing retraction of the locking pin. Further protrusion of the locking pin is also prevented by at least one of the proximal head (abutting the external surface of the pivotable body at the location of the aperture), the distal end of the main body or, preferably, a stop portion at the distal end of the locking pin.

There may be two aligned apertures in the pivotable body (one on either side of the recess), wherein one of them has a wide and a narrow portion, such that the neck of the locking pin can rest in the narrow portion of that (first) aperture.

The second aperture may have a diameter sufficient to allow a distal tip of the locking pin to rest within it, yet is too narrow to accommodate the distal stop portion of the locking pin. This is advantageous because it means that the locking pin is supported by the pivotable body at two points: one being the distal tip and the other being the neck. This decreases the likelihood that the pin would be damaged by excess force being applied to pull the fastener away from the second gate rail when the gates are in the closed and locked position.

Optionally, however, the pivotable body has aligned wide and narrow portions and the neck and collar of the locking pin are designed to rest in the narrow portions of each aperture. This means that the wide portion of the second aperture has a diameter sufficient to allow the stop portion of the locking pin to pass through it.

The pivot point of the pivotable body may be at a proximal end of the gate fastener and the integrated locking pin at a distal end of the gate fastener. The pivotable body comprising a recess for receiving a gate rail may otherwise be known as a throw over gate loop.

The gate fastener of the invention may hence comprise a locking pin having (at least):

a head at a proximal end thereof;

a neck;

a main body;

a collar; and a stop portion at a distal end thereof.

The stop or stop portion advantageously prevents the locking pin from being removed from the pivotable body, i.e., it makes the locking pin integral to the fastener. This is because it has a diameter that is too big to pass through the first aperture in the pivotable body.

Accordingly, the invention provides a gate fastener, comprising a fastener body (i.e., pivotable body) comprising a proximal pivot point, for pivotal attachment to a support, such as a support gate or gate post, and a distal throw over gate loop with downwards facing loop sides to retain a top bar of an adjacent gate, further comprising a locking pin mounted on one loop side, moveable between a first position in which the pin spans the loop sides and can retain the top bar, and a second position in which the pin is retracted and held in a slot in one gate side, so as to release the top bar so the gate can be opened.

The locking pin may comprise a head and a body joined by a neck, wherein in the second position the neck is held in the slot of the loop side. Preferably, the neck is of narrower diameter than both the body and the head.

The pin may be held in the retaining slot with its body outside the loop sides. As such, it is preferred that there is an aperture in a loop side for the pin to pass through. This aperture may have an approximately circular section with a slotted cut-out portion with a diameter narrower than the circular section and extending away from circular section; the body thus passes through the circular section but not the slotted extension, whereas the neck is able to pass through the slotted extension. The head may be wider than the circular section (to prevent passing through) with the pin able to move axially through the aperture. When the neck is aligned with the slot, the pin can move perpendicularly to the axis to a position where no axial movement is possible.

The invention also provides a locking pin for a gate fastener as described above and below, wherein the locking pin. The locking pin may comprise a head at a proximal end thereof; a neck; a main body; a collar; and a stop at a distal end thereof. The locking pin may also comprise a tip at the distal end of the stop.

The diameter of the neck, the collar and the distal tip may be smaller than that of the head, main body and stop.

The invention also provides a method for securing a double gate from opening, comprising fixing a gate fastener having a pivotable body to a first gate, such that the pivotable body may be pivoted about a first gate rail of the first gate;

wherein in the closed position the pivotable body lies in line with the first gate rail and at least partially houses it within a recess in the pivotable body;

wherein in the closed position the pivotable body lies in line with a second gate rail on a second gate and at least partially houses it within a recess in the pivotable body;

wherein the pivotable body comprises at least one aperture on a side thereof that is capable of retaining a locking pin; and characterised in that (a) in a first position, the locking pin spans the recess and prevents movement of the second gate rail out of the recess, and (b) in a second position, the locking pin is retracted from the recess such that a portion thereof is retained within the pivotable body without preventing movement of the gate rail out of the recess.

The aperture in the pivotable body may have a wide portion and a narrow portion, with only the wide portion permitting movement of the locking pin between the first and second positions.

It is preferred that to unlock the double gate, the user lifts the locking pin out of the narrow portion of the aperture and into the wide portion, such that the locking pin can be retracted from the recess, thus allowing the user to lift the pivotable body (e.g., using a handle) upwards and away from the second gate rail.

The locking pin may comprise a neck that is of smaller diameter than its main body. The neck may have a diameter that is smaller than the diameter of the narrow portion of the aperture in the pivotable body. The main body may have a diameter that is larger than the diameter of the narrow portion but of a diameter that is smaller than the diameter of the wide portion of the aperture in the pivotable body.

There may be two aligned apertures in the pivotable body (one on either side of the recess), wherein the first of them has a wide and a narrow portion, such that the neck of the locking pin can rest in the narrow portion of that first aperture. Preferably, the second aperture has a diameter sufficient to allow a distal tip of the locking pin to rest within it, yet too narrow to accommodate the distal stop portion of the locking pin. This is advantageous because it means that the locking pin is supported by the pivotable body at two points: one being the distal tip and the other being the neck. This decreases the likelihood that the pin would be damaged by excess force being applied to pull the fastener away from the second gate rail when the gates are in the closed and locked position.

Preferably, in use, a user can unlock the gates by lifting the locking pin using the head, such that it is positioned in the wide portion of the first aperture. The user can then retract the locking pin from the recess. Retraction is halted by the stop portion of the locking pin abutting an internal (recess-facing) surface of the pivotable body next to the first aperture. The locking pin is thus integral to the gate fastener. A handle can then be used to lift the pivotable body and free the second gate rail, such that the two gates are separated/opened.

Preferably, in use, a user can lock the gates by aligning the first and second gates and dropping the pivotable body onto the second gate rail, such that it is housed in the recess of the pivotable body. The locking pin can then be lifted into the wide portion of the first aperture and then protruded through the recess. Protrusion is halted by the stop portion of the locking pin abutting an internal (recess-facing) surface of the pivotable body next to the second aperture. The neck of the locking pin is then free to fall into the narrow portion of the first aperture, while the distal tip rests in the second aperture. The gates are thus locked.

When referring to the "open" and "closed" positions of the gate fastener/pivotable body, the open position refers to situations wherein the pivotable body is pivoted upward such that the second gate can freely pass under the gate fastener, while the closed position refers to situations wherein the pivotable body is pivoted downward such that the second gate sits within its recess. This contrasts from the definition of the gate itself being "open" or "closed", in that the gate is open when a user can freely pass through it, i.e., the gate does not sit within the recess of the pivotable body, however the gate may be open at times when the gate fastener is in the closed position.

Typically, a handle is provided to assist lifting the pivotable body away from the second gate and into the "open" position. Optionally, the handle is provided at the distal end of the gate fastener.

Optionally, the gate fastener further comprises a pivot stop that in use allows partial pivoting of the pivotable body but prevents full pivotable movement of the pivotable body. Advantageously, the presence of the pivot stop means that the pivotable body cannot be pivoted into a position in which it cannot freely fall back into the closed position. This is beneficial because it protects against user error, i.e., where the user has opened the gate and accidentally forgotten to close the gate after use.

The pivot stop may comprise at least one aperture in the pivotable body and a fastener passing through said aperture to limit pivot range of the pivotable body. The fastener may be a pin, screw or bolt. Preferably, there are two apertures located on either side of the recess and aligned with one another under the gate rail, so that when the fastener is passed through the apertures, it limits upward movement of the pivotable body.

The pivotable body may be metal in composition. Typically, it is formed from a single extrusion.

The gate fastener for use in the method of the invention is preferably as described elsewhere herein and illustrated in the below example in more detail.

In another embodiment, the invention provides a gate comprising the gate fastener of the invention.

EXAMPLES

Figure 4:
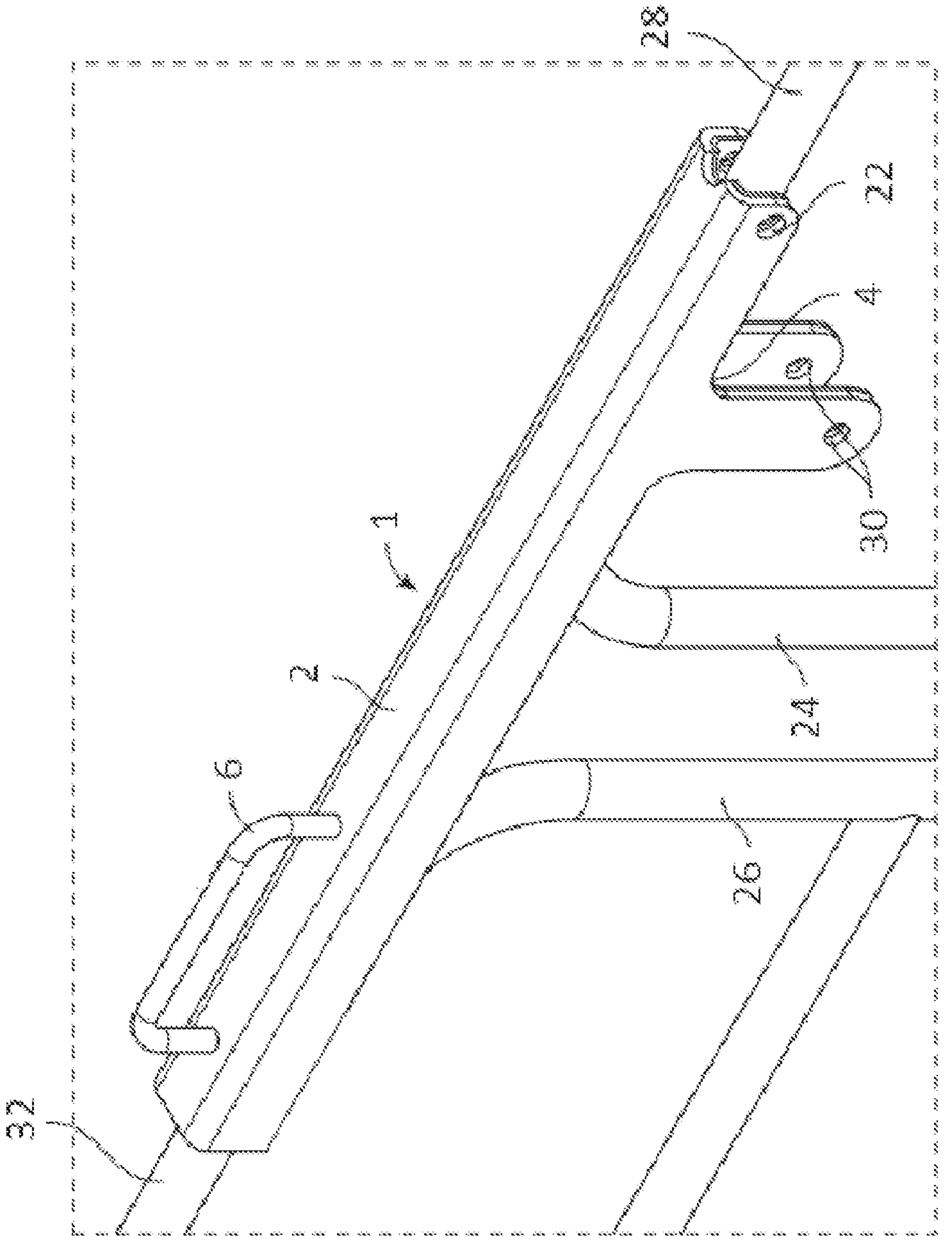

The invention is now illustrated in specific examples, with reference to the accompanying drawings (FIGS. 1-4) which show:

- End views of a gate fastener according to the invention (FIGS. 1A, 2A and 3A), with the integrated locking pin in different positions,
- Side views of a gate fastener according to the invention (FIGS. 1B, 2B and 3B), with the integrated locking pin in different positions, and
- A perspective view of a generic gate fastener that is mounted on a double gate in the closed position (FIG. 4).

As will be described in further detail below, FIG. 1A (end view) and FIG. 1B (side view) show a gate fastener (1) according to the invention, wherein the locking pin (12) is retracted from the recess (4) in the pivotable body (2), such that the pivotable body can be lifted (e.g., using the handle (6)) away from the second gate rail (32), allowing the double gates (24, 26) to be opened.

As will be described in further detail below, FIG. 2A (end view) and FIG. 2B (side view) show a gate fastener (1) according to the invention, wherein the locking pin (12) is partially protruded through the recess (4) in the pivotable body (2); this being a state representing the transition of the locking pin (12) between the retracted position, wherein the gates (24, 26) can be opened by lifting the pivotable body (2), and the protruded position, wherein the locking pin (12) spans the recess (4) and the gates (24, 26) are therefore closed and locked by the locking pin (12).

As will be described in further detail below, FIG. 3A (end view) and FIG. 3B (side view) show a gate fastener (1) according to the invention, wherein the locking pin (12) is protruded through the recess (4) in the pivotable body (2), such that the pivotable body is prevented from being lifted away from the second gate rail (32), due to the locking pin (12) abutting the bottom of the second gate rail (32). The double gates (24, 26) are thus closed and locked.

In more detail, the locking pin (12) is provided with a head (14) at its proximal end, which a user is able to grab and use to either protrude the locking pin through the recess or retract it from the recess. Next to the head is a neck (16) of smaller diameter than the head (14), followed by a main body (12) also of larger diameter than the neck (16). There is then provided a collar (20) of similar diameter to the neck (16), and at the distal end a stop portion (18) of larger diameter than the neck and collar (16, 20) with a distal tip (34) of similar diameter to the neck and collar (16, 20). In practice, the stop portion (18) at the distal end is screwed into the main body (12) and the collar (20) is formed between the two.

Aligned on either side of the recess (4) in the pivotable body (2) are two apertures, one of which has varying diameter—a wider portion (8) at the top and a narrower portion (10) at the bottom. When the double gates (24, 26) are closed and the second gate rail (32) sits in the recess (4), these two apertures are found below the bottom of the second gate rail (32). The narrow portion (10) of the first aperture is of a diameter sufficient to accommodate the neck and collar (16, 20) of the locking pin (12) but not the head (14), main body (12) or stop portion (18). The wide portion (8) of the first aperture (the "first" aperture being positioned at the proximal end of the locking pin when fully protruded through the recess) is of a diameter sufficient to accommodate the main body (12) but not the head (14) or stop portion (18). The second aperture (the "second" aperture being positioned at the distal end of the locking pin when fully protruded through the recess) is of a diameter sufficient to accommodate the distal tip (34) of the locking pin (12).

In use, a user lifts the pivotable body (2) with the locking pin (12) fully retracted, aligns the two gates (24, 26), and then lowers the pivotable body (2), such that the second gate rail (32) is housed in the recess (4) of the pivotable body (2). The user is then able to use the head (14) of the locking pin (12) to lift the locking pin into the wide portion (8) of the first aperture and then protrude it through the recess (4). The distal tip (34) of the locking pin (12) enters the second aperture when fully protruded. Protrusion is restricted by the stop (18) abutting the recess-facing side of the pivotable body (it is too wide to pass through either of the apertures).

At this point the neck (16) is positioned above the narrow portion (10) of the first aperture and the distal tip (34) is positioned within the second aperture. The locking pin (12) can then be lowered, such that the neck (16) rests in the narrow portion (10) of the first aperture and the distal tip (34) rests in the second aperture.

Retraction of the locking pin (without user intervention) is prevented because the main body (12) of the locking pin is too wide to enter the narrow portion (10) of the first aperture. The gates (24, 26) are thus locked together.

When the user wishes to unlock the gates (24, 26), the user lifts the locking pin (12) using the head (14), such that it is positioned in the wide portion (8) of the first aperture. The user can then retract the locking pin (12) from the recess (4). Retraction is halted by the stop portion (18) of the locking pin abutting an internal (recess-facing) surface of the pivotable body (2) next to the first aperture. The locking pin (12) is thus integral to the gate fastener (1). The handle (6) can then be used to lift the pivotable body (2) and free the second gate rail (32), such that the two gates (24, 26) can be separated/opened.

In FIG. 4, there is shown a generic gate fastener (1)—i.e., one without the integrated locking pin outlined above depicted—mounted on a double gate (24, 26). A pivot pin (not shown) is secured through two aligned apertures (22) in the gate fastener and a corresponding set of aligned apertures (not shown) in the top rail (28) of the first gate (24). This provides the gate fastener with a pivotable body (2) that pivots about an axis (22). The pivot pin passing through the apertures (22) in the fastener and rail both secures the fastener to the rail and enables it to pivot about axis (22). An inverted U-shaped recess (4) runs the length of the body and fits over the top rails (28, 32) of both gates (24, 26).

A further pin or bolt (not shown) may be secured through two aligned apertures (30) in a downwardly projecting portion or lug of the pivotable body (2). This provides the gate fastener with a pivot stop, such that when the pivotable body (2) is pivoted about axis (22) upwards and away from the gate rail (32) of the second gate (26), i.e., by pulling on the handle (6), pivoting is restricted by the pivot stop pin or bolt abutting the underside of the gate rail (28) of the first gate (24).

With that pivot stop pin or bolt in place, sufficient pivoting movement of the body is permitted for the recess (4) to clear the second gate rail (32) to open the gates. Upon lifting of the handle (6) and hence opening of the gate fastener, which clears the top rail (32) of the second gate (26), the user can open and pass through the double gates (24, 26). The user can then close and realign the gates and allow the gate fastener to drop back into its closed position.

The gate fastener (1) may also optionally be locked in the open position using a pin or bolt (not shown) that passes through aligned apertures (30) in the downwardly projecting portion of the pivotable body (2). This is achieved by inserting the pin through the apertures (30) when the gate fastener is in the raised, open position and the apertures (30) sit above the top rail (28) of the first gate (24), i.e., when pushing down on the handle (6), pivoting is prevented by the pin abutting the topside of the gate rail (28) of the first gate (24).

REFERENCE LIST

Gate fastener (1)
Pivotable body (2)
Pivotable body recess (4)
Pivotable body handle (6)
Wide portion of aperture (8)
Narrow portion of aperture (10)
Main body of locking pin (12)
Head of locking pin (14)
Neck of locking pin (16)
Locking pin stop (18)
Collar of locking pin (20)
Pivot pin aperture/axis (22)
First gate (24)
Second gate (26)
First gate rail (28)
Pivot stop apertures (30)
Second gate rail (32)
Distal tip of locking pin (34)

The invention hence provides a gate fastener having an integrated locking pin for double gates.

The invention claimed is:

1. A gate fastener (1) for securing a double gate (24, 26), comprising:

a pivotable body (2) that is fixable to a first gate (24) about a pivot point (22) at its proximal end, wherein the pivotable body comprises at least one recess (4) for receiving a gate rail (32) on a second gate (26);

wherein the pivotable body comprises at its distal end a locking pin (12) and at least two apertures that are aligned on either side of the at least one recess (4), the apertures retaining the locking pin, such that the locking pin is integrated within the pivotable body;

wherein the locking pin comprises a head (14) at a proximal end thereof, a neck (16), a main body (12), a collar (20), and a stop (18) at a distal end thereof, wherein the neck and the collar are of smaller diameter than the head, the main body, and the stop;

wherein a first of the at least two apertures has a wide portion (8) and a narrow portion (10), wherein the neck is of a diameter that is smaller than the diameter of the narrow portion such that it rests in the narrow portion, and wherein the main body is of a diameter that is larger than the diameter of the narrow portion but smaller than the diameter of the wide portion, such that the locking pin is secured in the narrow portion; and wherein:

(a) in a first position, the locking pin spans the recess and directly contacts the gate rail to prevent movement of the gate rail out of the recess, and (b) in a second position, the locking pin is retracted from the recess such that a portion thereof is retained within the pivotable body without preventing movement of the gate rail out of the recess.

2. The gate fastener of claim 1, wherein the locking pin is secured in the narrow portion (10) on the side of the pivotable body, such that it cannot be freely protruded and/or retracted therethrough.

3. The gate fastener of claim 1, wherein only the wide portion is configured to permit movement of the locking pin between the first and second positions.

4. The gate fastener of claim 1, wherein the narrow portion is provided (10) below the wide portion (8), such that the locking pin falls into the first position in which it cannot be retracted or protruded without user intervention and wherein the main body of the locking pin abuts an internal recess-facing surface of the pivotable body at the location of the at least one aperture when the neck is positioned in the narrow portion, thereby preventing retraction of the locking pin.

5. The gate fastener of claim 1, wherein a second of the two aligned apertures has a diameter sufficient to allow a distal tip (34) of the locking pin to rest therein but is too narrow to accommodate the stop (18) of the locking pin.

6. The gate fastener of claim 1, wherein the two apertures in the pivotable body have aligned wide and narrow portions and the neck (16) and the collar (20) of the locking pin are designed to rest in the narrow portions of each aperture, respectively.

7. The gate fastener of claim 1, wherein the locking pin further comprises a distal tip at a distal end of the stop (18).

8. The gate fastener of claim 1, wherein the stop (18) has a diameter greater than that of the at least one aperture and the stop (18) prevents the locking pin from being removed from the pivotable body.

9. A gate comprising the gate fastener of claim 1.

10. A method for securing a double gate (24, 26) from opening, comprising fixing a gate fastener (1) having a pivotable body (2) to a first gate (24), such that the pivotable body may be pivoted about a first gate rail (28) of the first gate, the pivot point (22) being at a proximal end of the pivotable body;

wherein in the closed position the pivotable body lies in line with the first gate rail and at least partially houses it within a recess (4) in the pivotable body;

wherein in the closed position the pivotable body lies in line with a second gate rail (32) on a second gate (26) and at least partially houses it within a recess (4) in the pivotable body;

wherein the pivotable body comprises at its distal end at least two apertures that are aligned on either side of the recess that retain a locking pin (12), such that the locking pin is integrated within the pivotable body;

wherein the locking pin comprises a head (14) at a proximal end thereof, a neck (16), a main body (12), a collar (20), and a stop (18) at a distal end thereof, wherein the neck and the collar are of a smaller diameter than the head, the main body, and the stop;

wherein a first of the at least two apertures has a wide portion (8) and a narrow portion (10), wherein the neck is of a diameter that is smaller than the diameter of the narrow portion such that it rests in the narrow portion, and wherein the main body is of a diameter that is larger than the diameter of the narrow portion but smaller than the diameter of the wide portion, such that the locking pin is secured in the narrow portion; and wherein:

(a) in a first position, the locking pin spans the recess and directly contacts the second gate rail to prevent movement of the second gate rail out of the recess, and (b) in a second position, the locking pin is retracted from the recess such that a portion thereof is retained within the pivotable body without preventing movement of the gate rail out of the recess.

11. The method of claim 10, wherein the locking pin is secured in the narrow portion (10) on the side of the pivotable body, such that it cannot be freely protruded and/or retracted therethrough.

12. The method of claim 10, wherein only the wide portion is configured to permit movement of the locking pin between the first and second positions.

13. The method of claim 10, wherein the narrow portion is provided below the wide portion, such that the locking pin falls into the first position in which it cannot be retracted or protruded without user intervention and the main body of the locking pin abuts an internal recess-facing surface of the pivotable body at the location of the at least one aperture when the neck is positioned in the narrow portion, thereby preventing retraction of the locking pin.

14. The method of claim 10, wherein the stop (18) has a diameter greater than that of the at least one aperture and the stop (18) prevents the locking pin from being removed from the pivotable body.

15. The method of claim 10, wherein a second of the two apertures has a diameter sufficient to allow a distal tip (34) of the locking pin to rest therein but is too narrow to accommodate the stop (18) of the locking pin.

* * * * *